Dec. 12, 1967    KIYOSHI INOUE    3,357,912

ION-CONTROL SYSTEM FOR ELECTROCHEMICAL MACHINING

Filed Oct. 17, 1963    4 Sheets-Sheet 1

KIYOSHI INOUE
INVENTOR.

BY Karl F. Ross

AGENT.

KIYOSHI INOUE
INVENTOR.

BY Karl F. Ross
AGENT

United States Patent Office 3,357,912
Patented Dec. 12, 1967

3,357,912
ION-CONTROL SYSTEM FOR ELECTRO-
CHEMICAL MACHINING
Kiyoshi Inoue, 182 3-chome, Tamagawayoga-machi
Setagaya-ku, Tokyo, Japan
Filed Oct. 17, 1963, Ser. No. 316,955
Claims priority, application Japan, Oct. 19, 1962,
37/46,310; Apr. 2, 1963, 38/16,835; Apr. 13, 1963,
38/19,277; May 7, 1963, 38/23,448; May 20, 1963,
38/26,686; Aug. 15, 1963, 38/43,178
2 Claims. (Cl. 204—224)

My present invention relates to improvements in electrochemical-machining methods and apparatus and, more particularly, to a method of eliminating some of the disadvantages arising from earlier systems of this type.

Earlier electrochemical-machining methods as, for example, shown in U.S. Patent No. 3,058,895 to Williams, have made use of an electrode closely but spacedly juxtaposed with a workpiece, a source of direct current being connected across the electrode and the workpiece for erosion of the latter in an electrolyte bath. This principle is also disclosed in my U.S. Patent 3,223,603, issued Dec. 14, 1965, and an earlier filed application, Ser. No. 765,616 of October 6, 1958, now abandoned. The machining action of systems of this type is primarily an electrolytic erosion of the workpiece surface juxtaposed with the electrode in the electrolyte in such manner that the eroded surface tends to conform to the surface of the electrode or tool. This will be apparent when it is assumed that one or another portion of the workpiece may be closer to the electrode than still other portions in which case the current flow is concentrated at these proximal regions which are thus eroded more rapidly. In general it must be pointed out that it is desirable in almost all circumstances to operate under such conditions that $d$, the width of the gap between the electrodes, is proportional to I, the current flow, and that both of these are constant throughout the machining operation. For a constant unidirectional current, therefore, the resistance across the gap should be maintained substantially constant or some compensation should be made for the variation in resistance. Such compensation can be effected by monitoring the electrolyte temperature and controlling the power of the direct-current source in dependence upon this temperature.

Another disadvantage of earlier systems is that they are prone to ion contamination especially along the surface of the tool juxtaposed with the workpiece. This ion contamination is apparently characterized by a concentration of relatively nomobile ions at certain regions of the tool surface, especially those having cavities or inclinations of a type adapted to trap particles. This explanation is, of course, somewhat simplified since the ionic particles may not be mechanically trapped as individual atomic fragments but may be held by electrostatic forces in such manner that they do not participate in the current flow through the electrolyte across the gap. Moreover, relatively immobile ions may tend to agglomerate in certain regions as particles electrostatically held to larger particles in the region of the gap. Concentrations of immobile ions in a nonuniform manner throughout the gap causes an increase in the resistance across the gap at the contaminated areas and frequently in decreased current flow. In addition, the unidirectional field established between the electrodes has a magnetic component in the region of the electrode axis which exerts a "pinch" effect upon the ions and tends to concentrate them, again promoting non-homogeneous resistance and passage of elevated and reduced currents at different locations.

Earlier methods of reducing ion contamination and polarization at the juxtaposed surfaces of the anode and cathode have usually involved the use of high electrolyte flow rates and pressures in the region of the gap, the electrolyte flow exerting forces upon the contaminating ions to entrain them away from the electrode surfaces. Another disadvantage of earlier electrochemical-machining techniques derived from the relatively high work functions of the workpiece material with respect to electrolytic erosion. As is the case with photon bombardment of photoemissive material, the liberation of anion of the workpiece material into the electrolyte requires a relatively high energy and a strong electric field. The use of excessively high voltages is not possible, however, with aqueous electrolytes since the gassing potentials of the electrolyte are rapidly exceeded and only a minimum of erosion can take place whereas considerable electrolyte is lost. Moreover, certain materials could not be readily machined heretofore by conventional techniques because of the presence of certain elements in the crystal lattice which are not readily ionizable under the conditions necessary for the erosion of other elements from the lattice. With materials such as tungsten, for example, it is usually desirable to render the workpiece positive while applying a negative potential to the counterelectrode. Tungsten carbide cannot, however, be machined in this fashion since electrochemical machining of carbon, even when present in the tungsten-carbide lattice, requires other conditions. All of these difficulties have limited the universal applicability of electrochemical machining and created difficulties with regard to accurate or precise reproduction of the desired configuration. This is especially true of ionic contamination which prevents a uniform current density from being attained across the gap and further increases the field necessary to overcome the anode and cathode work functions at the junction of these surfaces with the electrolyte.

It is the principal object of the present invention, therefore, to provide a method for electrochemically machining conductive (i.e. metallic) bodies, wherein ion contamination of the electrode surfaces is a negligible factor.

Another object of this invention is to provide a method for reducing the electric field necessary to overcome the work function of the workpiece material at the workpiece/electrolyte interface.

A further object of this invention is to provide a method of electrochemically machining tungsten carbide and like materials not readily machinable by earlier electrochemical techniques.

Still another object of my invention is to provide a method of electrochemically machining metallic bodies wherein the inductive effect tending to concentrate ions in a particular region of the machining gap is rendered less significant.

A further object of the present invention is to provide improved apparatus for controlling the electrochemical machining of conductive bodies and carrying out the improved methods mentioned above.

In accordance with the present invention, the foregoing objects, and others which will become apparent hereinafter, are attained by a method of machining an electrolytically erodable conductive workpiece in which a first electrode is spacedly juxtaposed with the workpiece constituting a second electrode in an electrolyte liquid; passing a primary, essentially unidirectional (i.e. direct) electric current between the electrodes to electrolytically erode portions of the workpiece confronting the first electrode; and subjecting the gap to a high-frequency alternating current whose periodically reversed polarity, at a frequency between 100 cycles/sec. and one megacycle/sec., for example, periodically reverses so as to partially neutralize the ions accumulating at the juxtaposed surfaces of the electrodes during respective half-cycles of this alternating current. Thus the high-frequency alternating current applied across the gap neutralizes negative ions during the positive half-cycles and positive ions during the negative half-cycles. Moreover, the high-frequency field, even when not directly neutralizing the ions exerts repeatedly applied electric field forces to them which apparently causes their mechanic dislodgment. As ion can thus be imagined as a charged particle suspended between two plates subjected to an alternating-current field. The particles will be seen to oscillate in such a field under the alternately repelling and attracting forces. This hypothesis, although a simplified explanation of what possibly takes place when the high-frequency alternating current is applied to the electrodes, suggests that the ions are oscillated and thus, although they are able to migrate in the unidirectional electric field, cannot adhere readily to one or the other electrode faces. The ions no longer adherent to the electrode faces are rapidly neutralized upon dislodgment into the electrolyte and participate in the current flow.

I have also discovered that the use of a high-frequency alternating current across the machining gap tends to reduce the field necessary to overcome the work function at the workpiece/electrolyte interface. This work function, when plotted against the potential applied thereacross, has an exponential characteristic whose slope changes in sign depending upon the direction of the electric field. It is believed that the use of a high-frequency alternating current which, of course, periodically changes in polarity, tends to reduce the work function to a magnitude intermediate the extremes that would be prevalent if the peak or trough potentials of the alternating current field would be maintained as a consequence of a hysteresis effect at the interface. Furthermore, the high-frequency alternating current field disrupts the magnetic field of the unidirectional current and reduces the magnetic effect upon the ion. There is, consequently, less tendency to concentrate ions at a particular region of the spark gap.

According to a further feature of this invention, the amplitude of the essentially unidirectional electric current is reduced periodically for an interval which can be short relative to the duration of the unidirectional current flow. Advantageously, the potential across the electrodes and the current flow therethrough is periodically reversed in order to reduce the amplitude of the unidirectional current. This periodic and temporary reversal, which can be effected by the use of an ohmic, inductive or capacitive impedance across the rectifier supplying pulsating direct current to the electrodes, results in a partial dispersion of ions accumulated on the electrode surfaces and, in addition, permits the machining of substances like tungsten carbide containing electronegative constituents such as carbon. Apparently the reversal of current flow results in the migration of hydrogen ions to the normally positive workpiece and a reaction at the latter with carbon at exposed portions in the tungsten carbide body. The negative state of the workpiece is only temporary so that upon re-establishment of the machining conditions, the workpiece is again positive for erosion of tungsten. It is also possible that this periodic reversal or interruption of the unidirectional current reduces the work function at the electrode surfaces. In any case, such reversal for a period which is small compared with the duration during which the unidirectional current passes, results in a highly improved machining of tungsten carbide, platinum and like materials which have been difficult to deal with heretofore.

The above and other objects, features and advantages of the present invention will become more readily apparent from the following description, reference being made to the accompanying drawing in which.

Figure 1:
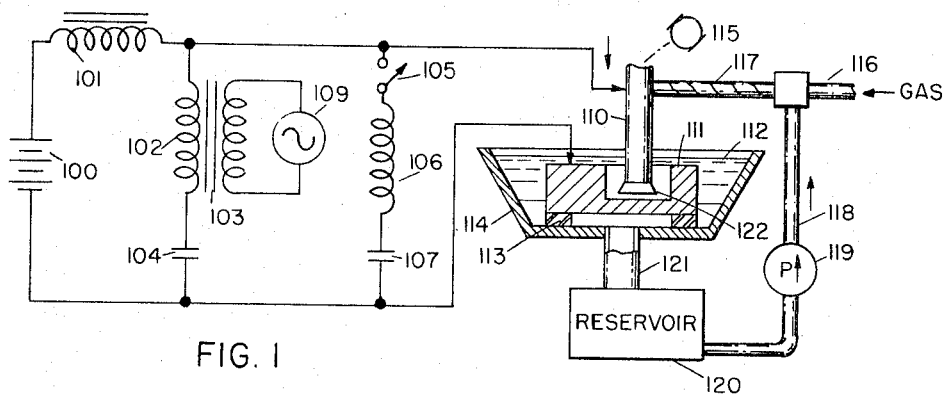
FIG. 1 is a cross-sectional view through an electrochemical-machining apparatus, shown diagrammatically, illustrating the circuit means thereof.

The system of FIG. 1 comprises a direct-current source 100 which supplies power to an electrode 110 and the workpiece 111 spacedly juxtaposed and immersed in an electrolyte 112 in vessel 114. The workpiece 111 is mounted upon insulating blocks 113 and constitutes the second electrode of the apparatus. The electrode is displaceable vertically by a servomotor 115 controlled in accordance with the size of the machining gap 122, to maintain the latter substantially constant, by any of the devices disclosed in my aforementioned apparatus or the patent to Williams. Electrode 110 is tubular so as to discharge electrolyte into the gap 122 and is supplied by a flexible tube 117 from the pressure line 118 of a circulating pump 119 whose intake extends into a sump or reservoir 120, into which vessel 114 discharges via a pipe 121. The electrode 110 forms a cavitation chamber at gap 122 and an inert gas is admixed with the circulating electrolyte via tube 116 to purge ions from the cavitation chamber. It should be noted, however, that, for the purposes of the present invention, the addition of a gas is not essential although highly advantageous.

The supply circuit for the electrodes is provided with a resonant network which can be connected thereacross by a switch 105, this network including an inductance 106 and a capacitance 107. When the resonant network is inserted via switch 105, the natural frequency of the network is superimposed upon the direct current of source 100. The high-frequency alternating current can also be obtained from an external source namely a high-frequency oscillator or generator 109 inductively coupled to another resonant network 103 connected across the electrode 110 and the workpiece 111. Network 103 includes an inductance 102, constituting the secondary winding of a transformer across whose primary winding, the A.C. source 109 is bridged, and a capacitor 104 in series with the inductance 102. A choke 101 is provided in circuit with battery 100 to insure the necessary lag.

Figure 2:
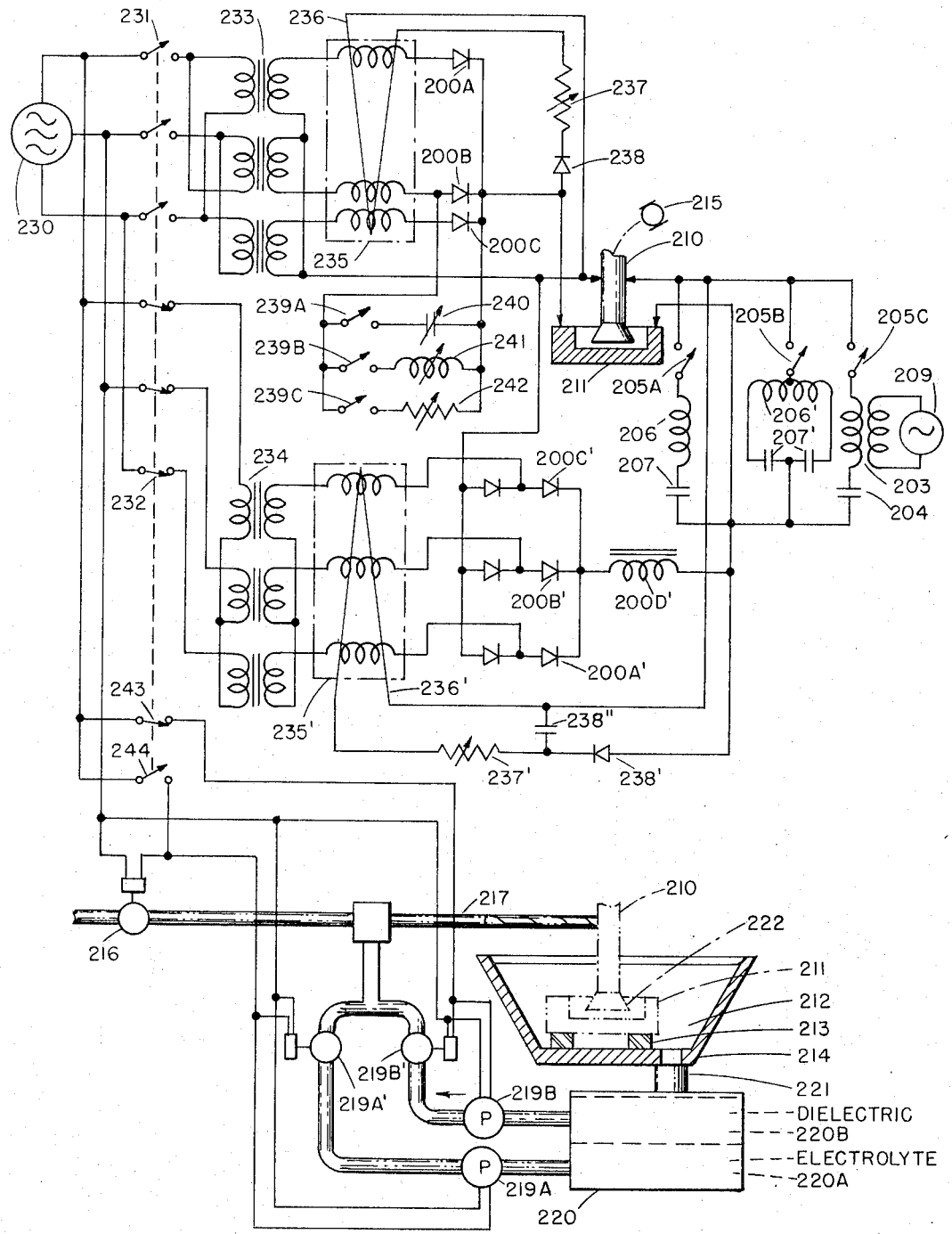
FIG. 2 is a view similar to FIG. 1 of an apparatus suitable for successive use in electrochemically machining a metallic workpiece and finishing the latter by spark discharge.

In the apparatus of FIG. 2 a three-phase alternating-current line source 230 feeds the ganged switches 231, 232 which supply current to respective three-phase isolation transformers 233, 234. Each of the secondary windings of transformer 233 is connected in series with the respective winding of a saturable-core transformer 235 whose control winding is shown at 236. A rectifier 238 and a variable resistor 237 are connected in series with control winding 236 across the electrode 210 and the workpiece 211, which are also shown in dot-dash lines within vessel 214 in that portion of FIG. 2 in which the electrolyte-circulation means is illustrated. The three outputs of saturable-core transformer 235 are connected in series with respective rectifiers 200a, 200b, 200c which convert the alternating current to pulsating direct current which is then supplied to the workpiece 211, forming the positive electrode of the system. The negative electrode 210 is returned to a bus bar common to the secondary windings of isolation transformer 233. Switches 239a, 239b, 239c are connected, respectively, is series with a variable capacitor 240, a variable inductance 241 and a variable resistor 242, constituting impedances which can be selectively bridged across rectifier means 200b.

The ganged switches 232, which are coupled with switches 231 so that the latter are opened when the former are closed, and vice versa, supply three-phase alternating current to the primary winding of isolation transformer 234. The secondary windings of the latter are connected in series with respective windings of a saturable-core reactor 235' whose control winding 236' is in series with a potentimeter 237' and a rectifier 238', a capacitor 238" bridging this control winding and forming a differentiating circuit with variable resistor 237'. The three outputs of reactor 235' supply respective rectifier bridges 200a', 200b', 200c' whose positive terminal is connected to the workpiece 211 and whose negative terminal is tied to electrode 210. The latter is provided with a motor 215 to maintain the spark gap at a predetermined magnitude.

A switch 205a, in series with an inductance 206 and a capacitance 207, serves to connect this resonant network across the electrode 210 and workpiece 211. Similarly, switch 205b is connected in series with the center tap of an inductance 206' whose branches are in series with respective condensers 207', thereby forming a parallel-resonant network. In addition, an external source of high-frequency alternating current 209 is inductively coupled to a series-resonant network 203 whose capacitor 204 is in series with the transformer secondary and a switch 205c.

Another pair of switches 243, 244 is coupled for simultaneous operation with switches 231 and 232. Switch 243 serves to energize an electromagnetic valve 219b' and a pump 219b associated therewith for circulating a dielectric liquid (e.g. kerosene) 220b from reservoir 220 through flexible tube 217, electrode 210, vessel 214 and outlet 221. The workpiece 211 it mounted upon insulating blocks 213 within this vessel. Similarly, switch 244 serves to actuate an electromagnetically controlled valve 216 by means of which an inert gas (e.g. nitrogen) is admixed with circulating electrolyte, a second electromagnetically controlled valve 219a', and a pump 219a, by means of which aqueous electrolyte (e.g. a sodium-chloride solution) 220a is circulated from reservoir 220 through the electrode 210 and vessel 214.

During the primary stages of operation, switches 231 and 244 are closed while switches 232 and 243 are open. Under these circumstances, a unidirectional current of low voltage flows through the gap 222 between the electrode 210 and the workpiece 211. Rectifiers 200a–200c provide half-wave rectification of the three-phase current. When, however, one of the switches 239a–239c is closed, an impedance is bridged across the rectifier means 200b and the wave form of the current supplied to the electrodes is of the type shown in FIG. 3. This wave form, illustrated for a capacitor, has a reversal or negative portion of relatively short duration and magnitude intermediate two positive waves of longer duration. The positive pulse $T_0$ serves to machine the workpiece, which can be tungsten carbide, while the reversal or the remainder of the half-cycle T results in a reversal of polarity to remove exposed carbon from the tungsten-carbide body. One or more of the switches 205a–205c may be closed to superimpose upon the direct-current pulses a high-frequency alternating current to yield a wave form such as that illustrated in FIG. 5 except that the negative pulse is not shown in this illustration. Subsequent to the electrochemical machining of the workpiece 211, the latter can be finish-formed by spark discharge.

In this case, switches 231 and 244 are opened and switches 232, 243 are closed. The direct current of rectifier bridges 200a'–200c' is then applied as a discharge via an impedance 200d' across the electrodes. While the closure of switch 244 for electrochemical machining causes circulation of electrolyte through the gap 222, operation of switch 243 results in the circulation of a dielectric liquid through the gap. The networks 237, 238 and 237', 238', 238" are responsive to the potential across the gap and maintain the power supplied thereto substantially constant during both spark-discharge machining and electrochemical erosion. The dielectric and electrolyte liquids are separated within reservoir 220 as a consequence of their different specific gravities. During electrochemical machining an inert gas is added to the electrolyte at 216, as previously described.

Figure 3:
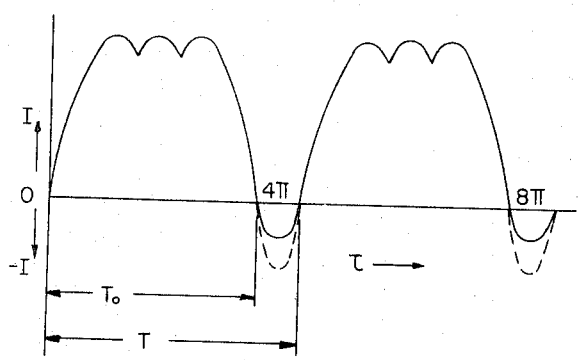
FIGS. 3–5 are graphs in which current is plotted against time illustrating the output supplied to the electrodes of electrochemical-machining apparatus in accodance with the invention.
Figure 4:
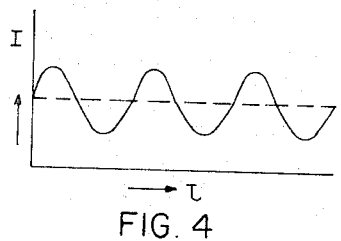
Figure 5:
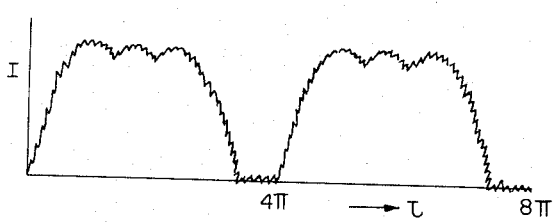

While FIGS. 3 and 5 show electromechanical-machining wave forms such as are obtainable with the device of FIG. 2, FIG. 4 shows a wave form applied to the electrodes by the apparatus of FIG. 1. From the graph of FIG. 4 it may be seen that the amplitude, peak-to-peak, of the alternating current superimposed by source 109 upon the direct current of battery 100, may equal the amplitude of this direct current (dot-dash line) without reversal of the polarity across the electrodes. It should be noted, however, that a wave form of the type illustrated in FIG. 4 is also suitable for disruption of ion accumulations along the electrode surface and for the reduction in the work function at the workpiece surface.

Figure 6:
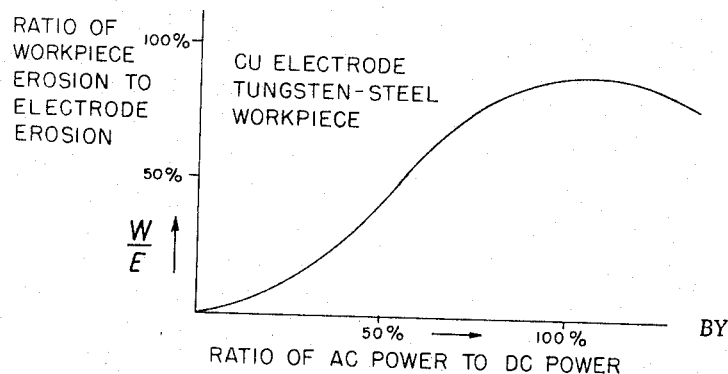

In FIG. 6 I show a graph of the ratio of workpiece erosion to electrode erosion, plotted in percent along the ordinate, versus the ratio of alternating-current power to direct-current power, plotted in percent along the abscissa. The alternating-current power referred to is, in effect, the average power taken over the entire cycle. The plot shows the results obtained when a copper electrode was employed to machine a tungsten-steel workpiece. From the graph it may be observed that a maximum of electrode efficiency is obtained when the ratio of AC power to DC power is about 100 percent, i.e. when the superimposed alternating current is sufficient during some half-cycles to reduce the electrode current to zero or even cause partial reversal.

Figure 7:
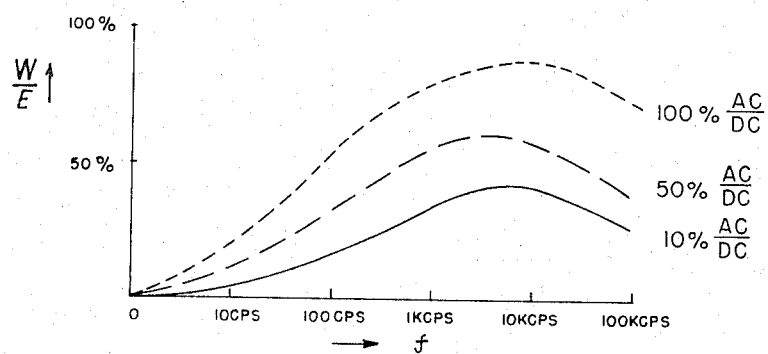
FIGS. 6 and 7 are other graphs explaining the principles of the present invention.
Figure 10:
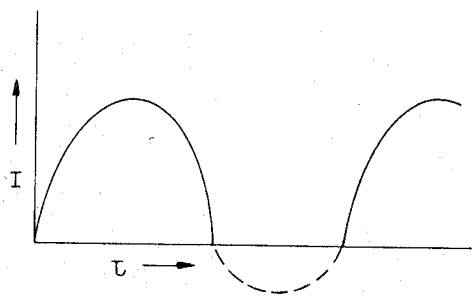
FIG. 10 is a graph of current versus time obtainable with the system of FIG. 9.

FIG. 7 shows the dependency of the ratio $W/E$ of workpiece wear to electrode wear upon the frequency of the superimposed alternating current. Each of the curves, plotted for 10%, 50% and 100% ratios of alternating-current power to direct-current power, show a maximum of electrode efficiency between 1 and 10 kilocycles/sec. for the copper electrode with the tungsten-steel workpiece.

Figure 8:
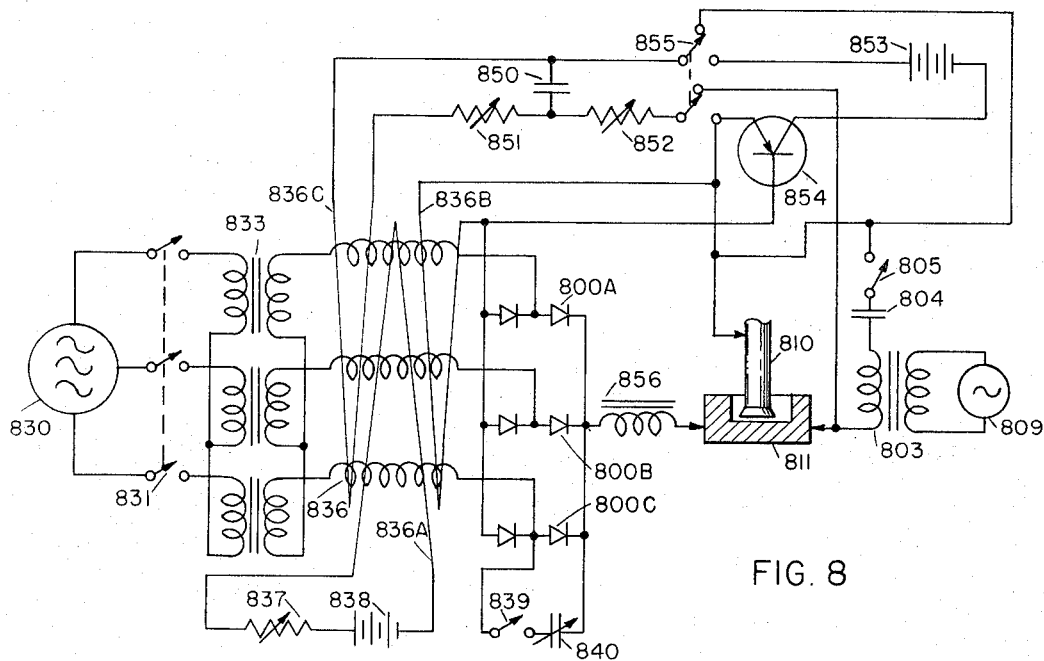
FIGS. 8 and 9 are figures similar to FIG. 1 of still other electrochemical machining devices.

In FIG. 8 I show another system for the electrochemical machining of a workpiece 811. In this system a three-phase alternating-current source 830 supplies the isolating transformer 833 via respective switches 831, the individual outputs of transformer 833 being connected in series with respective windings of a saturable-core reactor 836 whose biasing winding 836a is connected in series with a variable resistor 837, for setting the bias, and a battery 838. A control winding 836b of this reactor is connected in a base/emitter circuit of a transistor 854 while a battery 853 is provided for this switching element. A time-delay network consisting of a capacitor 850 and a pair of variable resistors 851, 852 in circuit therewith, is selectively connectable to the emitter/connector circuit of transistor 854 or across the electrode 810 and workpiece 811 by means of a double-pole double-throw switch 855. The outputs of the saturable-core reactor 836 are fed to respective rectifier bridges 800a–800c, and a smoothing choke 856 to the workpiece 811 while the negative terminal of each bridge is connected to the electrode 810 via the control winding 836b. A capacitor 840 can be connected across the rectifying means by a switch 839 to produce a periodic negative pulse as illustrated in FIG. 3 while a further switch 805 can connect the resonant network 803 and its capacitor 804 across the electrodes for superimposition of the high-frequency alternating current of source 809 upon the direct-current pulse (as shown in FIG. 5).

The control winding 836b of the saturable-core reactor 836 is thus in series with the processing gap between the electrodes and is arranged so as to buck the biasing effect of winding 836a. The control current is supplied through the time-lag network 850–852. The processing current is determined by the degree of saturation of reactor 836, this degree of saturation being, in turn, a function of the mutual reaction between the positive exciting winding 836a and the negative exciting winding 836b, the latter having a reactance one-tenth or less than that of the positive winding 836a. When the current in the machining gap becomes excessively large, the current rises in winding 836b and transistor 854 is rendered conductive, when switch 855 connects this transistor to the time-delay network. A current is now passed through windings 836c to reduce the degree of saturation and thus the power supply to the electrodes. Simultaneously, the current flowing in winding 836b is reduced and transistor switch 854 is again rendered nonconductive. The result is a pulsating direct current of the type shown in FIG. 3 with a clipping action to prevent excessive current flow. When switch 855 is actuated to cut out the transistor 854, the delay network 852, 853 operates periodically to control the current through winding 836c and the sequence previously described is repeated.

Figure 9:
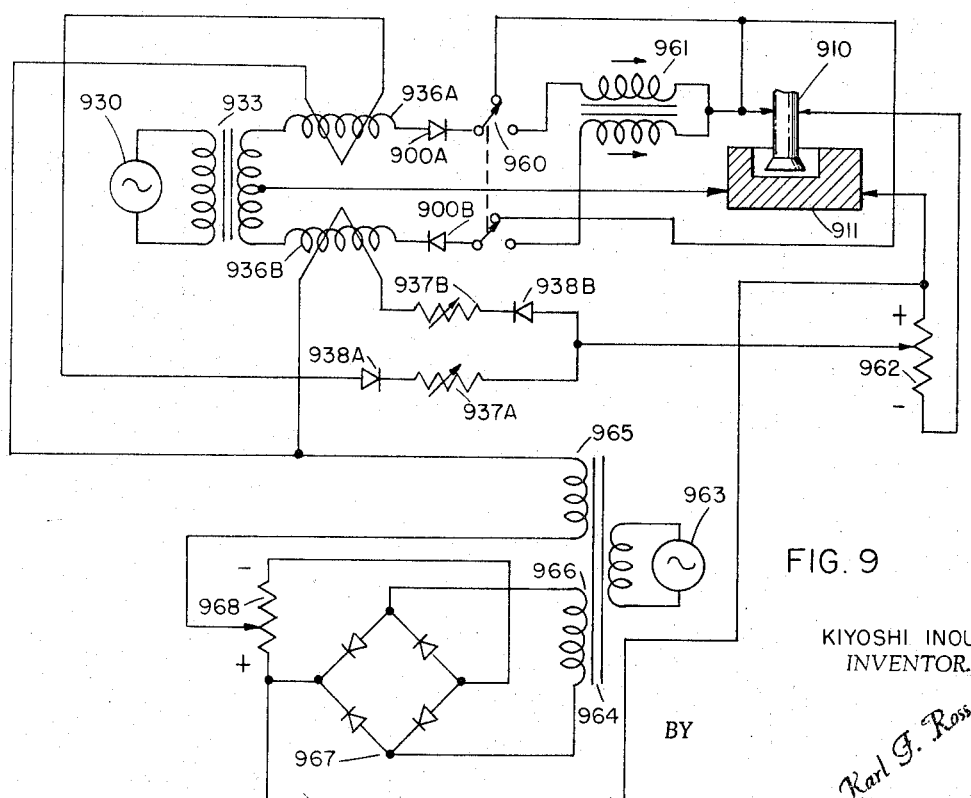

In FIG. 9, I show another apparatus for reversing the polarity of or decreasing the amplitude of the unidirectional current supplied to an electrochemical-machining system. In the latter, an alternating current source 930 supplies a transformer 933 whose secondary winding is centertapped, this tap being tied to the workpiece 911b. Each branch of the secondary winding is connected in series with a respective saturable-core reactor 936a, 936b and a pair of oppositely poled rectifiers 900a, 900b. A double-pole double-throw switch 960 connects the output of these rectifiers jointly to electrode 910 or to aiding windings of a transformer 961 via which electrode 910 is energized. Rectifier 900b can be considered to be a high-resistance current path on alternate half-cycles so that the pulse applied to the electrodes will have a negative lobe of small magnitude as compared with the positive pulses. This effect is reinforced when transformer 96 is cut in. The saturable-core reactors can be made relatively more or less conductive via their biasing windings which are connected in series with respective variable resistors 937a, 937b and rectifiers 938a, 938b. A bridge circuit 962, 968 is connected across the electrode 910 and workpiece 911 for supplying current to the biasing windings, the bridge circuit being energized by a rectifier bridge 967 from the secondary winding 966 of a transformer 964 whose alternating current source is shown at 963. Another secondary winding 965 serves as a return for the control current. The embodiments of FIGS. 8 and 9 have electrolyte-circulating systems as shown in FIG. 1.

*Example I*

A tungsten-steel workpiece is machined in an apparatus of the type illustrated in FIG. 1 with a copper electrode, the gap therebetween being maintained between 0.05 and 0.1 mm. The electrode is an aqueous solution of sodium chloride (5%) and a current density of 40 amps/cm.$^2$ is used. The machining speed is approximately 0.02 g./min. when a direct current voltage of 7 volts is employed and the electrolyte is supplied through the electrode at a pressure of 2.5 kg./cm.$^2$. When a high-frequency alternating current (5 volts peak-to-peak) is superimposed upon the direct current (the wave form being substantially that of FIG. 4) the machining speed under the same conditions is increased by two-and-a-half times. Moreover, it has been found that machining operations requiring gaps of 0.05, 0.1 and 0.3 mm. can be carried out respectively with gaps of 0.18, 0.2 and 0.5 mm. when the high-frequency alternating current is superimposed upon the direct current in a power ratio of 50%. Best results were obtained when a frequency between 4 and 150 kc./sec. was employed.

*Example II*

A tungsten-carbide body composed 60% by weight of tungsten carbide and 40% by weight of cobalt was machined with the apparatus of FIG. 2. During the electrochemical process, a voltage between 5 and 10 volts was applied across the electrodes during the positive portions of the process (FIG. 3), an average current of 1000 amps. being employed over 300° of each cycle, the current being reversed by insertion of one of the impedances 240, 241, 242 during the remaining 60°, the reverse current flow being approximately 300 amps. The current density again was about 40 amps/cm.$^2$ of electrode surface and the electrolyte a 5% solution of sodium chloride. After initial machining by this electrochemical method, the workpiece was finished by spark discharge in a kerosene dielectric. During the electrochemical machining step a frequency of about 10 kc./sec. was supplied by source 209 and increased the machining rate by two-and-a-half times. The machining gap in this case was 0.1 mm. and tungsten carbide was found to be machinable excellently. When the process was carried out without the superimposed high frequency, which had a voltage peak to peak of 8 volts, only limited erosion of the tungtsen-carbide surface was noticeable. The spark discharge machining was effected by the application of 100 volts across the electrodes and the current of 5–10 amps (average). The electrode was copper.

*Example III*

The experiments graphed in FIGS. 7 and 8 were carried out with the aid of a copper electrode and a tungsten-steel workpiece with a work gap of 0.05 mm. The tests included variation of the ratio of superimposed alternating current to direct current power and showed a peak in electrode efficiency just below a ratio of 100%, and a test of the frequency dependence of the electrode efficiency. The latter test (FIG. 7) showed that superimposed frequencies between 1 kc. and 200 kc. were effective, with better results between 4 kc. and 150 kc., depending upon the AC/DC power ratio.

The invention described and illustrated is believed to admit of many modifications within the ability of persons skilled in the art, all such modifications being considered within the spirit and scope of the appended claims.

I claim:

1. Apparatus for machining a conductive workpiece, comprising an electrode spaced from said workpiece to form a machining gap, means for providing an electrolyte fluid flow through said gap, servo means for maintaining a predetermined gap spacing between said workpiece and electrode, a machining power source comprising a source of alternating current potential, a transformer primary connected across said source, a transformer secondary, a center tap of said secondary connected to one terminal of said gap, and a pair of oppositely poled rectifiers, each connected between a different terminal of said secondary and the other terminal of said gap, and a variable impedance connected in series with at least one of said rectifiers and said secondary.

2. The combination as set forth in claim 1 wherein said variable impedance comprises a saturable reactor means connected in series with at least one of said rectifiers and said secondary for selectively varying the impedance in series with said rectifier.

References Cited
UNITED STATES PATENTS

| | | | |
|---|---|---|---|
| 3,193,485 | 7/1965 | Vincent | 204—141 |
| 3,284,691 | 11/1966 | Schulz et al. | 204—143 |
| 2,470,668 | 5/1949 | White | 315—284 X |
| 2,752,529 | 6/1956 | Croco et al. | 321—25 |
| 2,774,930 | 12/1956 | Bixby | 321—25 |
| 2,793,992 | 5/1957 | Heuser | 204—143 |
| 2,901,588 | 8/1959 | McKechnie. | |
| 2,905,605 | 9/1959 | Keeleric et al. | 204—143 |
| 3,014,155 | 12/1961 | Inoue | 219—69 |
| 3,058,895 | 10/1962 | Williams | 204—143 |
| 3,087,044 | 4/1963 | Inoue | 219 69 |

FOREIGN PATENTS 1,290,734  3/1962  France.

OTHER REFERENCES

Popilov, Zavodskaya Laboratoriya, vol. 14, 1948, No. 3, pp. 358–361.

ROBERT K. MIHALEK, *Primary Examiner.*

JOHN H. MACK, *Examiner.*